United States Patent [19]

Summers

[11] 4,150,662
[45] Apr. 24, 1979

[54] SOLAR ENERGY STRUCTURE

[76] Inventor: Verl R. Summers, 282 S. 200 East, Hyrum, Utah 84319

[21] Appl. No.: 805,277

[22] Filed: Jun. 10, 1977

[51] Int. Cl.² .................................................. F24J 3/02
[52] U.S. Cl. ..................................... 126/271; 126/270
[58] Field of Search ................. 126/270, 271; 237/1 A

[56] References Cited

U.S. PATENT DOCUMENTS

| | | | |
|---|---|---|---|
| 1,989,999 | 2/1935 | Niederle | 126/271 |
| 3,130,084 | 4/1964 | Loring | 126/270 |
| 3,866,285 | 2/1975 | Clark | 126/271 |
| 3,934,573 | 1/1976 | Dandini | 126/271 |
| 3,935,897 | 2/1976 | Pulver | 237/1 |
| 4,037,583 | 7/1977 | Bakum et al. | 126/271 |
| 4,056,092 | 11/1977 | Meier et al. | 126/271 |
| 4,065,053 | 12/1977 | Fletcher et al. | 126/271 |
| 4,069,809 | 1/1978 | Strand | 237/1 |

FOREIGN PATENT DOCUMENTS 991259  6/1951  France ....................................... 126/270

*Primary Examiner*—Kenneth W. Sprague

[57] ABSTRACT

Solar energy reflecting and collection structure for effecting improved energy recovery in solar collection systems. The reflecting structure includes cavities or depressions of parabolic character and, for ease of construction, are cast of aggregate and bonding agent materials. Such casting materials include extremely lightweight materials such as perlite, vermiculite, pumice, expanded shale and any volcanic aggregate. The casting technique utilized precludes the necessity for metal spinning or metal fabrication which is so expensive. The heat transfer tube utilized includes generally self-contained transparent or translucent cylindrical enclosures which have lens functions for concentrating, in dots, lines, or a combination of both, recovered solar energy, this to improve the temperature gradient on opposite sides of the heat exchanger tube wall so as to provide for a rapid and maximum recovery in utilization of heat, relative to the fluid carried by the heat exchanger tube.

8 Claims, 13 Drawing Figures

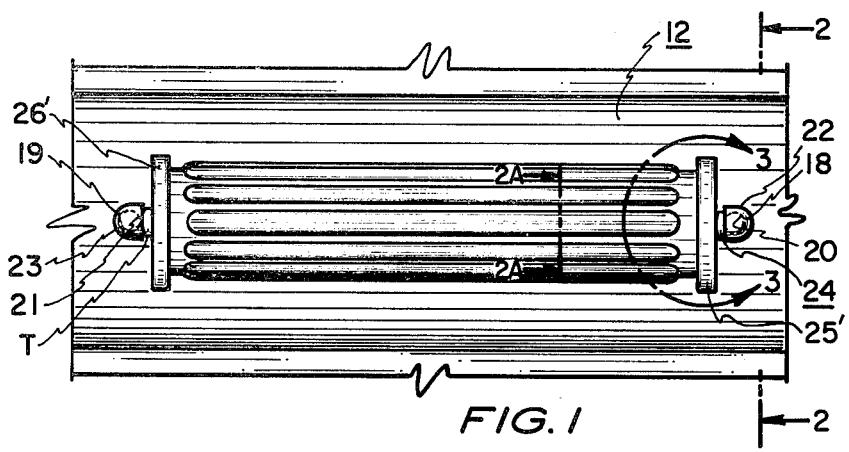
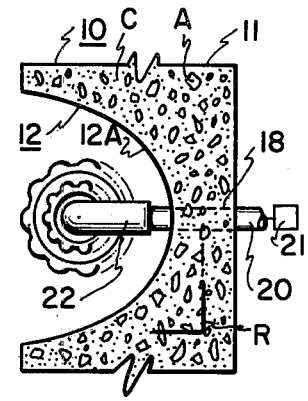
FIG. 1
FIG. 2
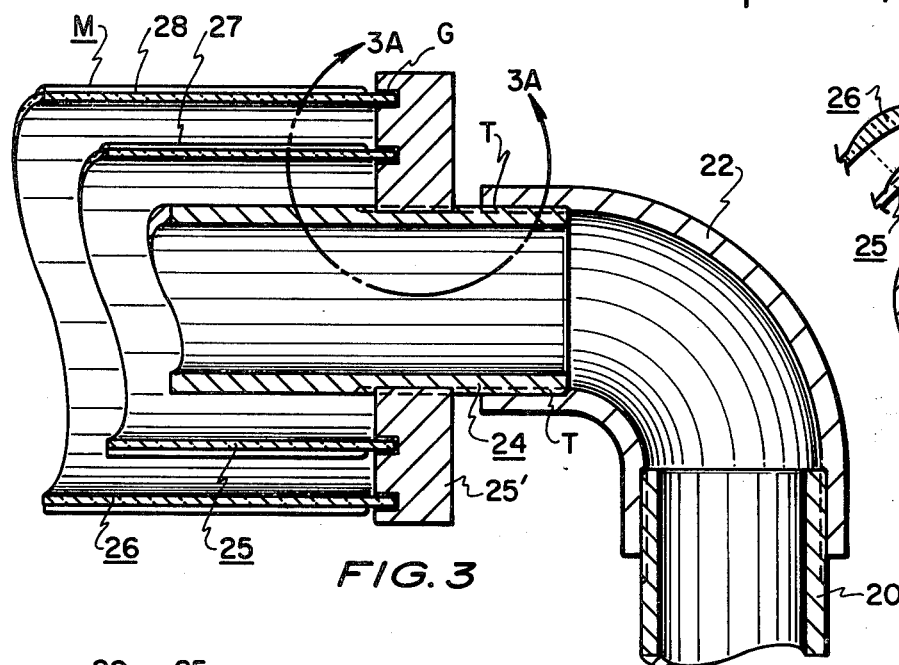
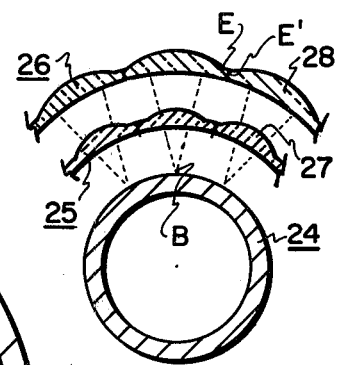
FIG. 3
FIG. 2A
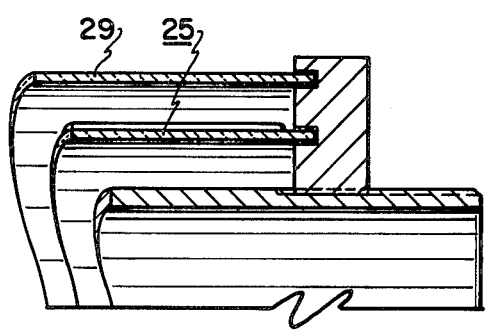
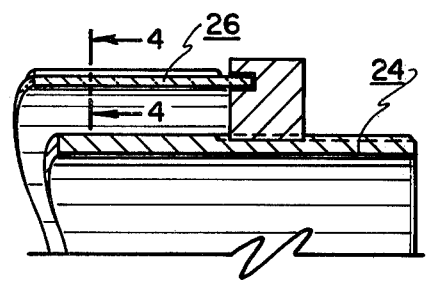
FIG. 3A
FIG. 3B
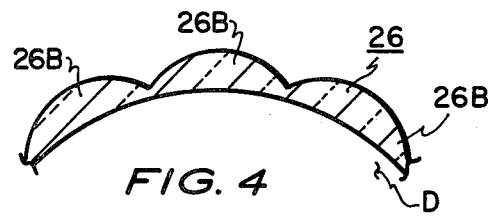
FIG. 4

SOLAR ENERGY STRUCTURE

FIELD OF THE INVENTION

The present invention relates to solar energy reflector and collection systems, and, more particularly, to new and improved structure which will reflect, receive and utilize solar energy to maximum advantage. The essential features of the invention include utilizing casting techniques for providing construction or other panels having cavities or depressions of parabolic character. The surfaces of such depressions or cavities are preferably treated or coated for suitable and increased reflectivity toward their respective focal points, lines or planes. Disposed at proximate focal points, lines or planes are heat collector structures respectively comprising a heat exchanger tube and one or more transparent or translucent cylindrical structures disposed thereabout and surrounding the tube, at least essentially. These enclosing structures take the form of lens means, having integrally formed, or affixed, cylindrical lens or circular lens segments or portions, which serve to focus, at lines or points, the oncoming solar energy, whether reflected or incident, as to the heat exchanger tube. Structures are designed so that incoming energy is focused completely about the tube in a series of lines or points or both, so as to maximize temperature gradient and heat transfer, simultaneously ensuring minimized likelihood of warping owing to differing surface temperatures relative to the heat exchanger tube.

DESCRIPTION OF PRIOR ART

Many types of reflectors and heat collectors have been used in the past. Customary of course is the flat-plate collector which is an enclosed rectangular box provided with serpentine tubing soldered or otherwise secured to a copper plate. Present techniques for fabricating solar collectors are notoriously expensive, requiring as they do a very large copper or other metallic sheets, suitable coatings, specialized solders, and so forth; furthermore, owing to uneven energy collection tubes utilized are apt to warp. Other highly expensive structures are the parabolic reflectors, whether of elongate form or whethey they constitute paraboloids of revolution, i.e., with a common axis passing through the focus. The latter require expensive metal-spinning and the former need expensive dies, as parabaloidal sheets are to be formed as by some metal stamping or drawing operation.

No prior art is known teaching, as herein, cast parabaloidal forms as utilized herein nor lens focusing along lines or points completely about the periphery of the heat exchanger tube.

BRIEF DESCRIPTION OF INVENTION

A brief description of the present invention, accordingly, comprises the concept of utilizing the technique of casting a panel, whether a construction panel, a roof or wall segment or the like, wherein the same is formed of aggregate and a binder. The aggregate may take the form of perlite, vermiculite, pumice, expanded shale, gravel or volcanic aggregate and may include some kind of plastic or cementitious binder. The casting process is extremely inexpensive, and large panels may be very light-weight and comprise quite large roof or wall sections. The paraboloidal cavities or depressions cast or formed in such panels may be utilized as cast-formed, or can be parged or treated with suitable reflective coating materials, and plastic protective materials, so that the surfaces will be highly reflective, of long life, and not subject to material surface-decay by the elements. The heat collector itself comprises a tube that is peripherally surrounded concentrically by one or more lens means, the same comprising essentially a tube having spherical or cylindrically lens segments or portions. These lens means serve to focus light, whether in lines or in dots, upon the exterior of the tubes so as to increase the temperature gradient relative to the inside and outside wall surfaces of the tube and thus enhance heat transfer as to the fluid carried by the tube. The light is focused essentially about the entire periphery of the tube so that uneven heating and warpage of such tube is precluded.

OBJECTS

Accordingly, a principal object of the present invention is to provide a new solar energy collection system and components therefor.

A further object is to provide a cast parabolic reflector.

A further object is to provide a solar energy collector by which the fluid constraining structure is heated in an optimal manner.

A further object is to provide lens means about a heat exchanger conduit, wherein light energy is essentially focused uniquely and peripherally about such conduit.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF DRAWINGS

FIG. 1 is a fragmentary top plan of solar energy reflector and collector structure, constructed in one form of the invention.

FIG. 2 is a transverse vertical section taken along the line 2—2 in FIG. 1.

FIG. 2A is an enlarged fragmentary section, taken along the line 2A—2A, and illustrating the focusing character of the lens means surrounding the heat exchanger tube.

FIG. 3 is an enlarged fragmentary section taken along the arcuate line 3—3 in FIG. 1, and is rotated 90°.

FIG. 3A is a fragmentary section taken along the line 3A—3A in FIG. 3.

FIG. 3B is similar to 3A but illustrates but one cylindrical enclosure relative to the heat exchanger tube shown.

FIG. 4 is an enlarged, fragmentary detail of a representative transparent lens means surrounding the heat exchanger tube and is taken along the line 4—4 in FIG. 3B.

DESCRIPTION OF PREFERRED EMBODIMENTS

In FIGS. 1 and 2 the construction panel 10 is shown to comprise a cast panel 11 which has a cavity 12 of parabolic character. Cast panel 11, permissibly including reinforcing R, is conceivably formed of concrete including cement, sand and gravel, but is preferably a light-weight cast panel made of suitable aggregate A with bonding agent C.A suitable aggregate would be, in addition to or other than gravel, light-weight materials such as perlite, vermiculite, pumice, expanded shale, or any one of the volcanic aggregates. The bonding agent can be a sand and cement mixture, cement alone, or any one of several kinds of bonding plastics, by way of example. It was noted that the surface 12A of cavity 12 comprises, as to its transverse cross section, see FIG. 2, essentially a parabola. This is to say, deviations from true parabolic form, of whatever algebraic equation, will deviate only slightly, if at all, from a true parabola.

The surface 12A, where light-colored, will be reflective, as to light proximate the focal line of the elongate parabolic cavity 12. For increased reflectivity, surface 12A may be parged: this is, the surface pores may be filled with a grout or fine cement mixture so as to make the surface very smooth.

Figure 7A:
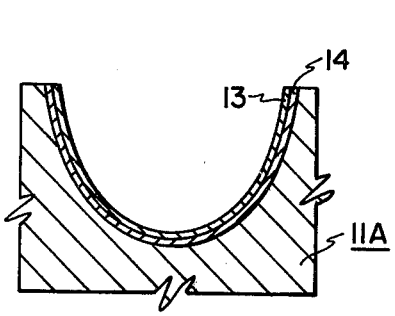
FIG. 7A and FIG. 7B are transverse vertical sections taken along the arcuate line 7—7 in FIG. 6, illustrating various protective and reflective coatings that may be utilized in connection with each individual parabolic cavity of the cast panel of FIG. 6.

Alternatively, see FIG. 7A, there may be provided successive coatings such as a transparent plastic coating 13 disposed over reflective coatings 14, e.g., an aluminum-silver paint; or indeed, the coating may comprise a laminated coat consisting of a usual base black paint 15, a sprayed or sputtered aluminum coating 16, followed by a silver coating 17. Where desired, the silver coating 17 may include some type of protective layer such as a 13 in FIG. 7A. In any event, it is intended that the construction panel 10 have highly reflective, parabolic surface cavities. While parabolic or paraboloidal surfaces of revolution can be used, it would generally be desired for the cavities to be elongate as indicated at 12, in FIG. 1.

As to these construction panels 10 or cast panels 11, the same may comprise roof sections, wall sections, or other types of construction areas, the cavities of which are exposed to solar, photon radiation. The cavities at 12 may take the form as seen at 12B in FIG. 6 so that plural or multiple cavities of parabolic cross-section exist, this by a single casting, for example, of a panel.

It becomes apparent, then, that the present invention supplies a parabolic reflector panel, in the form of cast panel, which can be extremely light-weight and very inexpensively manufactured. Also, the panels will be highly insulative, fireproof, rigid, and resistant to corrosion and other construction problem areas. It is noted that the customary enclosed collectors, copper sheets, and extensive fabrication generally found in prior art solar collectors are avoided.

In returning to FIG. 1 and FIG. 2A, it is seen that the cast panel will generally be provided, at each parabolic cavity, with a pair of apertures 18 and 19 to serve as conduit passageways for connecting conduit 20 and 21. These conduits are attached as by threading or other securement to elbows 22 and 23. Elbows 22 and 23 are secured to the opposite ends of heat exchanger tube 24, the same being provided with flanges 25' and 26', see FIGS. 1 and 3. One or both of the flanges 25', 26' may be secured to the heat exchanger tube in an integral manner; however, it is deemed advisable for the flanges, or at least one of them, to be threaded to the tube as shown in FIG. 3. Tube 24 will generally be made on bronze or copper, owing to their favorable heat-transfer characteristics. The outer ends, of course, will be threaded at T to provide securement cooperation relative to the elbows and flanges, opposite ones being similarly constructed.

As shown in FIGS. 1 and 3, disposed about the heat exchanger tube 24 are concentric light focusing means 25 and 26. These may take one of several forms, such as formed or molded fresnel lenses or, perphas more appropriately, molded plastic sheets which are individually bent in circular form and self-contain respective cylindrical portions at 27 and 28, which in the aggregate form a series of cylindrical lenses as seen in FIG. 2A and FIG. 4. Cylindrical lenses, as they are customarily known, and their capacity to focus in a straight line, are well known in the stereoscopy art, for example, and comprise elongate lenses or lens segments or portions individually having an elongate, outwardly convex, essentially cylindrical-surface segment, usually corrected for chromatic and other aberrations, the opposite surface being flat or having a large radius of curvature. See FIG. 4, for example, wherein the cylindrical lens portions 26B are integrally formed, edge to edge. It is well known, again the cylindrical lenses will have the capacity of focusing light in an essentially straight line. What the present invention supplies, therefore, are one, two or more generally cylindrically formed, cylindrical-lens-incorporating sheets which are pre-formed or bent about an axis common to the heat exchanger tube 24, so as to form essentially cylindrical enclosures for the heat exchanger tube 24. These lens means 25 and 26 may be cylindrically configured unitary pieces, or may have their ends E and E' bonded together or proximate each other, essentially to form such an enclosure, see FIG. 2A.

The action of these cylindrical means 25 and 26 is to serve to focus the light as at B, see FIG. 2A, in high-temperature lines along the surface of heat exchanger tube 24. Conceivably but one lens means, as at 25 in FIG. 3A, can be utilized, with the outer transparent cylinder as at 29 in FIG. 3A serving simply as an enclosure or cover to prevent loss of heat relative to heat exchanger tube 24. Alternatively, the lens means 25 may be deleted and means 29 in FIG. 3A comprise a cylindrical fresnel lens. FIG. 3B illustrates the situation wherein a single cylindrical lens means as at 26 is employed to surround the heat exchanger tube 24. Lens means edges fit in grooves G.

Figure 6:
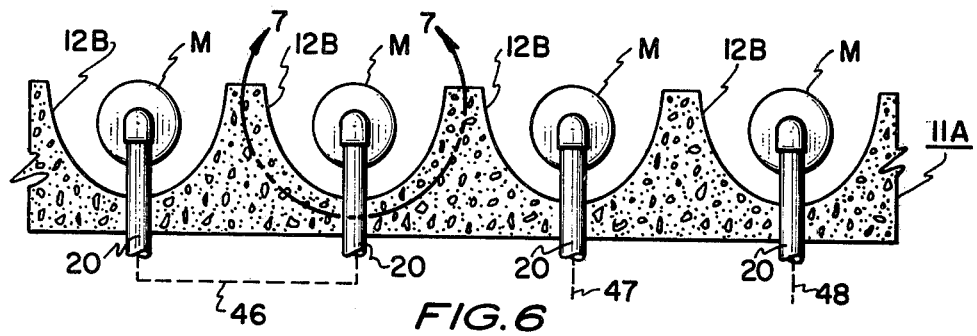
FIG. 6 is a fragmentary vertical reflection of a cast roof panel, for example, incorporating plural parabolic cavities with their associated solar energy collector means as shown in FIG. 3 and FIG. 5A.

The operation of the structure as thus far described is as follows. The cast panel 11, of whatever form, and whether singular or plural cavity, as shown in FIG. 6 of cast panel 11A, serves to receive photon emanations from the sun and to reflect these back proximate the focal line of the cavity, which can be proximate the position of the surface of heat exchanger tube. It will be noted that focusing in enhanced, see FIG. 2A, by the inclusion of the cylindrical lens means 25, 26, or at least one of them, so that light is focused in very sharp lines along mutually spaced points B of the exterior heat exchanger tube 24. Hence, instead of attempting to rely upon a singular heat-line on tube 24, or requiring a very, very small tube to achieve the concentration of heat desired, the present invention actually focuses incoming rays along a series of several heat-lines about the periphery of the heat exchanger tube 24. This maximizes utilization of the parabolic reflecting surface of the cast panel to produce a series of hot lines completely about the surface of the tube, making the same more effective and increasing the heat transfer characteristics of the tube to its interior and, indeed, completely about the interior thereof. Such a production of heat-lines about the tube 24 tends to preclude warpage thereof, due to otherwise uneven temperature distribution. As to the heat exchanger tube itself, the same will conduct fluid such as liquid, gas, or a combination of both, the same for direct of indirect utilization in space heating or for other heating purposes.

FIG. 4 illustrates the situation of a singular cylindrical lens 26 means, composed of contiguous cylindrical lens portions 26B, being employed to surround the heat exchanger tube 24. It is noted that lens means 26 here serves both to focus light in a series of lines, parallel to the axis tube 24 in a mutually spaced pattern about the circumference of the tube, as well as enclosing the air chamber D disposed about the tube.

Figure 5A:
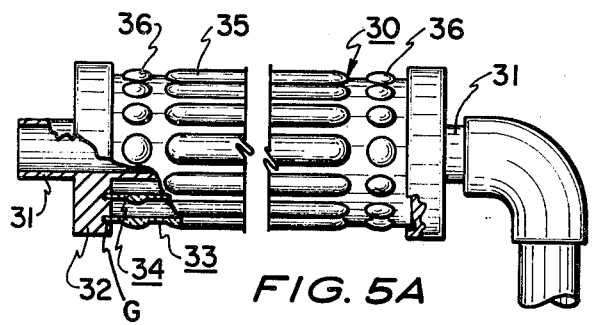
FIG. 5 and FIG. 5B are similar to FIG. 3 and illustrate alternative forms of the invention, to-wit, as to FIG. 5A the outermost lens means having both cylindrical and spherical lens segments and portions and, as to FIG. 5B, wherein the outermost lens means includes solely spherical lens segments or portions.

FIG. 5A illustrates optional heat collector structure 30 having the heat exchanger tube 31 provided with integral flanges 32. This may likewise form the construction of the structure associated with heat exchanger tube 24 in FIG. 3 where desired. For convenience, preferably one of the flanges will be secured to the opposite end of the heat exchanger tube, as heretofore described. In FIG. 5A the cylindrical lens means 33 and 34 are formed, this time, of both cylindrical lens segments 35 and also sperical lens segments 36. Both lens segments or lens segment portions may be separate parts, simply cemented in place or actually, and preferably, molded in the cylindrical means-forming process so that light-focusing characteristics will occur, note not only as to straight lines on the heat exchanger tube, but also hot spots will be focused proximate either end of the heat exchanger tube 31 by the spherical lens segments or portions of 36, to thereby longitudinally increase temperature gradient.

Figure 5B:
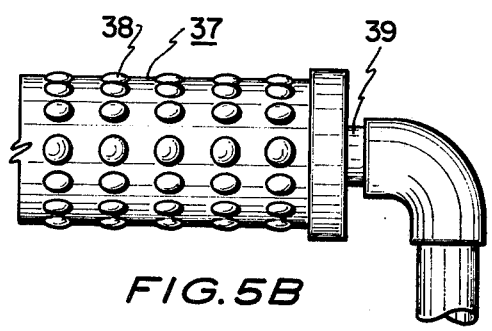

FIG. 5B illustrates a slightly modified construction relative to the heat collector tube structures 37, is similar to that shown in FIG. 5A, but illustrates the condition where solely spherical or circular lens segments or portions 38 are employed about the periphery of the heat exchanger tube 39, similar to that shown at 31 in FIG. 5A; this time the light is focused in a series of dots or points about the heat exchanger tube.

It is important to note that the result is the production of several highly concentrated lines or dots of solar energy upon the exterior of the heat exchanger tube 24, for example. This measurably increases the effectiveness of solar heating of fluid passing through the heat exchanger tube since, first of all, the light is concentrated and focused of several dots or lines completely about the tube; secondly, the temperature is greatest and the temperature gradient increased so as to provide for maximum heat transfer through the well of the tube and, finally, the heat in being essentially applied uniformly as to dots or lines about the tube will prevent the same from warping, owing to otherwise, uneven surface temperatures.

Figure 8:
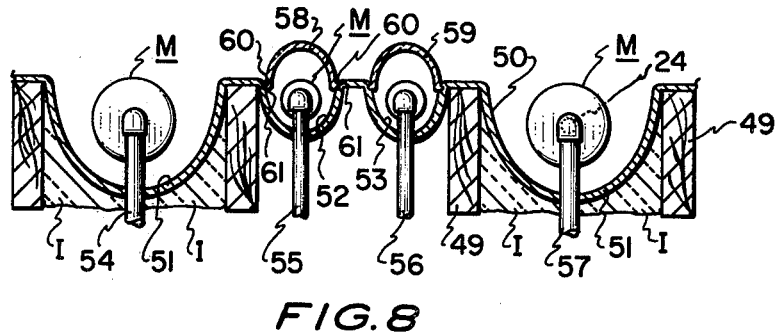
FIG. 8 is a vertical section of a building roof structure, showing the roof joists and the same supporting parabolic structure and solar energy collectors, utilized herein.
Figure 7B:
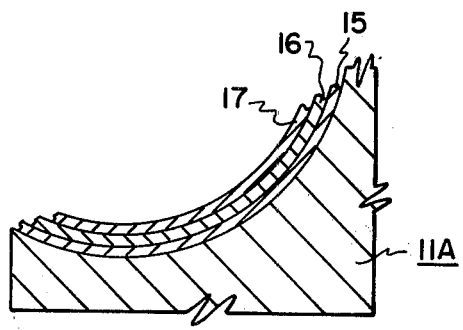

The structure of FIGS. 3-8 will likewise be employed in roof designs as shown in FIGS. 6-8. Thus, the several heat collection means M, of whatever form, e.g., FIG. 3, may be employed in FIG. 6 proximate the focus of each elongate parabolic cavity as at 12B relative to each cavity as seen in FIG. 6. The conduit 20 can be serially connected as shown by the dotted line 46 in FIG. 6 so that the collectors M are serially disposed. Alternatively, the collectors M may be disposed in parallel relative to any pumping in heat storage system as shown by dotted lines 47 and 48 in FIG. 6. Precise connection of the plumbing leading to the heat collectors and/or parabolic reflectors forms no part of this invention and may take any one of several established forms.

FIG. 8 illustrates a series of ceiling or roof joists 49 supporting a roof layer 50. This may be formed of metal, or be cast, and curved as indicated, merely by way of example. The troughs 51 have parabolic cross sections as well as do the shallower troughs 52 and 53. The heat collector means are provided with suitable plumbing at 54-57. Covers, preferably having hyperbolic, transverse cross sections are disposed at 58 and 59 and have lips 60 thrust into grooves 61 so as to provide air-tight and water-tight seals, were desired. The roof installations of structures such as that shown in FIG. 8 are very desirous, particularly in the temperate region of the United States, by way of example, and may include insulation I as seen in FIG. 8. The roof serves not only to protect the interior from inclement weather but also provides parabolic reflecting structure and the heat collectors which are efficient and which provide for optimum and maximum heat transfer to the heat exchanger tubes accommodating the fluid flow of the heating system. The transparent covers 58 and 59, especially where of essentially hyperbolic, transverse cross sections, serve generally to both retain and increase energy concentration relative to the enclosed heat storage heat exchanger tube 24.

What is provided therefor is a construction panel, generally extremely light in weight which includes parabolic depressions, generally of elongate form, such depressions being treated for high, light energy reflectivity to the heat collector employed. It is noted that since it is light that is being reflected, the panel construction, which generally will be cast, need not be covered unless especially desired as in roof construction in FIG. 8. Rather, it is the enclosure of the heat exchanger tube, and especially the essentially directional focusing effect of the one or two lens means used, circumferentially enclosing the tube, which offers maximum heating, of focused character, relative to the heat exchanger tube for the necessary heat transfer and heat storage desired. The panels may be reinforced by reinforcing metal or other structure R, see FIG. 2.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a hollow, elongate heat exchanger having threaded opposite ends, a pair of mutually spaced flanges respectively threadedly disposed on said ends, each of said flanges having annular recesses, said recesses being mutually aligned, and elongate, cylindrically formed lens means extending between said flanges, seated in said grooves, and positioned with respect to said heat exchanger for focusing sunlight onto said heat exchanger.

2. In combination, a hollow, fluid conductive heat exchanger having an outer surface and having mutually spaced threaded portions, a pair of flanges respectively threaded on said threaded portions and having aligned, mutually facing recesses, elongate parabolic reflector means disposed about said heat exchanger, and cylindrically-formed lens means disposed about said heat exchanger and seated in said flange recesses for concentrating sunlight at plural areas peripherally about said heat exchanger at said outer surface thereof.

3. The combination of claim 2 wherein said lens means comprises a light-transmissive molded, manually curvable sheet developed as a cylinder surrounding said heat exchanger and having plural lens portions for concentrating incident sunlight onto said heat exchanger, and arranged in a pattern surrounding said heat exchanger.

4. The combination of claim 3 wherein said lens portions comprise respective cylindrical lenses.

5. The combination of claim 3 wherein said lens portions comprise spherical lenses.

6. The combination of claim 3 wherein said lens portions comprise medial cylindrical lenses and end spherical lenses.

7. The combination of claim 3 wherein said lens means is molded to include said lens portions.

8. In combination, an elongate, heat-exchanger fluid conduit provided with mutually spaced independent flanges, said flanges each being provided with corresponding, mutually facing, essentially similar annular recesses, and a flexible plastic sheet means having molded lens portions and manually cylindrically formed to seat and thereby being seated in said recesses and thereby surrounding said heat exchanger fluid conduit between said flanges, for focusing sunlight on said heat exchanger fluid conduit.

* * * * *